(12) United States Patent
Codilian et al.

(10) Patent No.: US 6,958,881 B1
(45) Date of Patent: Oct. 25, 2005

(54) DISK DRIVE CONTROL SYSTEM HAVING A SERVO PROCESSING ACCELERATOR CIRCUIT

(75) Inventors: Raffi Codilian, Irvine, CA (US); Travis E. Ell, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 41 days.

(21) Appl. No.: 10/724,407

(22) Filed: Nov. 26, 2003

(51) Int. Cl.[7] .............................................. G11B 5/596
(52) U.S. Cl. ................................. 360/77.08; 360/77.01
(58) Field of Search .............................. 360/31, 60, 53, 360/49, 77.02, 77.08, 78.04, 78.08, 78.14

(56) References Cited

U.S. PATENT DOCUMENTS

| 5,325,247 | A | 6/1994 | Ehrlich et al. |
|---|---|---|---|
| 5,638,230 | A | 6/1997 | Kadlec |
| 5,717,538 | A | 2/1998 | Cheung et al. |
| 6,205,494 | B1 | 3/2001 | Williams et al. |
| 6,212,588 | B1 | 4/2001 | Bruner et al. |
| 6,215,608 | B1 * | 4/2001 | Serrano et al. ................ 360/60 |
| 6,469,979 | B1 | 10/2002 | Joo et al. |
| 6,490,121 | B1 | 12/2002 | Pruett et al. |
| 6,657,805 | B2 * | 12/2003 | Nishida et al. ................ 360/60 |

* cited by examiner

Primary Examiner—David Hudspeth
Assistant Examiner—Jason Olson
(74) Attorney, Agent, or Firm—Robroy Fawcett, Esq.

(57) ABSTRACT

Disclosed is a control system for processing sampled servo data in a disk drive. The control system includes a microprocessor and a servo processing accelerator circuit for performing operations on the sampled servo data while the microprocessor is executing firmware code. The accelerator circuit supports the use of a higher servo bandwidth thus allowing a higher track density resulting a greater storage capacity for the disk drive. Also, the accelerator circuit relieves the microprocessor of the ordinary servo processing function. Thus, the microprocessor's limited processing capacity to be directed to other controller and interface functions of the disk drive. Only under unusual conditions, such as a write-unsafe (WUS) limit exception, does the microprocessor need to direct processing capacity to the servo processing function. Further, the accelerator circuit may be a decreased response time after reading the servo data from the disk.

17 Claims, 9 Drawing Sheets

DISK DRIVE CONTROL SYSTEM HAVING A SERVO PROCESSING ACCELERATOR CIRCUIT

BACKGROUND OF THE INVENTION

1. Field of the Invention

The present invention relates to magnetic disk drives, and more particularly, to a disk drive having a servo processing accelerator circuit.

2. Description of the Prior Art and Related Information

Competitive market factors have continually pushed disk drive manufacturers to provide increased data storage capacity while rigidly controlling manufacturing cost. One key to increased storage capacity is increased track density, often expressed as tracks per inch or TPI. Disk drives having a higher TPI generally require a higher servo bandwidth. To support the higher servo bandwidth, more servo wedges are needed on the disk surface. Unfortunately, processing the additional servo wedges, depending on the task loading, may impact the ability of the disk drive's internal microprocessor to perform other tasks of lesser importance in a timely manner.

Accordingly, there exists a need for a increasing the servo bandwidth in a higher TPI disk drive without unnecessarily increasing the disk drive's manufacturing cost or performance.

SUMMARY OF THE INVENTION

The present invention may be embodied in a control system for processing sampled servo data in a disk drive. The control system includes a microprocessor for executing firmware code, and an accelerator circuit for performing operations on the sampled servo data while the microprocessor is executing the firmware code. The accelerator circuit has a position error signal (PES) calculator circuit for calculating a PES value based on the sampled servo data, and has a write unsafe (WUS) estimator responsive to the calculated PES value and to a WUS limit parameter. The WUS estimator further signals the microprocessor when the calculated PES value exceeds the WUS limit parameter.

In more detailed features of the invention, the control system may further include a bus for transmitting the WUS limit parameter from the microprocessor to the accelerator circuit. The accelerator circuit further comprises a WUS limit register for storing the WUS limit parameter and/or a PES register for storing the calculated PES value. The PES value may be further based on a parameter stored in a parameter register. The servo processing accelerator circuit may have a plurality of multipliers that may simultaneously perform parallel calculations.

Alternatively, the present invention may be embodied in a control system for processing data from sampled servo wedges for positioning a transducer head in a disk drive. In this embodiment, the servo processing accelerator circuit includes a position error signal (PES) calculator circuit for calculating a stream of PES values based on data read from the sampled servo wedges, and a servo-loop compensator for processing the stream of PES values and generating a stream of control effort values for positioning the transducer head during a track following operation.

Another embodiment of the invention may reside in a magnetic disk drive having a head disk assembly (HDA) and a control system. The HDA includes a rotating magnetic disk having distributed position information in a plurality of uniformly spaced-apart servo wedges for defining data storage tracks, an actuator for positioning a transducer head in response to a control effort signal, and the transducer head for periodically reading the distributed position information from the servo wedges and reading data from the data storage tracks. The control system has an accelerator circuit for implementing a first sampled servo controller, and has a second sampled servo controller separate from the accelerator circuit. The first sampled servo controller periodically adjusts the control effort signal based on the distributed position information only during a track-following operation under one or more of a first set of predetermined conditions. The first sampled servo controller also indicates the occurrence of a predetermined condition within a second set of predetermined conditions to the control system. The second sampled servo controller periodically adjusts the control effort signal based on the distributed position information during a track-following operation under one or more of a second set of predetermined conditions. The control system selects the first sampled servo controller for adjusting the control effort signal during a track-following operation under one or more of a first set of predetermined conditions, and selects the second sampled servo controller for adjusting the control effort signal during an operation under one or more of a second set of predetermined conditions.

In more detailed features of the invention, the control system further may include a disk controller for controlling disk operations, and a host interface for coupling the disk controller with a host system. The second sampled servo controller, the disk controller and the host interface may be implemented by a microprocessor that is separate from the accelerator circuit. The second sampled servo controller may be implemented by the microprocessor using firmware code. The accelerator circuit may have a plurality of multipliers that may simultaneously perform parallel calculations. The first set of predetermined conditions may include track following within a write unsafe limit, and the second set of predetermined conditions may include track following outside of a write unsafe limit.

In other more detailed features of the invention, the first sampled servo controller, after receiving distributed position information in a servo wedge, can adjust the control effort signal after a first processing delay. In contrast, the second sampled servo controller, after receiving distributed position information in a servo wedge, can adjust the control effort signal after a second processing delay that is greater than the first processing delay. For example, the first processing delay may be less than one-tenth of the second processing delay. Alternatively, the first processing delay may be less than one-fourth of the second processing delay.

Yet another embodiment of the invention may reside in a magnetic disk drive in which the control system includes an accelerator circuit for implementing a first sampled servo controller for periodically adjusting, only during a track-following operation under one or more of a first set of predetermined conditions, the control effort signal based on the distributed position information with a first processing delay, and the control system includes a microprocessor, separate from the accelerator circuit, for implementing a second sampled servo controller using firmware code for periodically adjusting the control effort signal based on the distributed position information, with a second processing delay that is substantially greater than the first processing delay, during an operation under one or more of a second set of predetermined conditions. The control system selects the first sampled servo controller for adjusting the control effort signal during a track-following operation under one or more of a first set of predetermined conditions, and selects the second sampled servo controller for adjusting the control effort signal during an operation under one or more of a second set of predetermined conditions.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
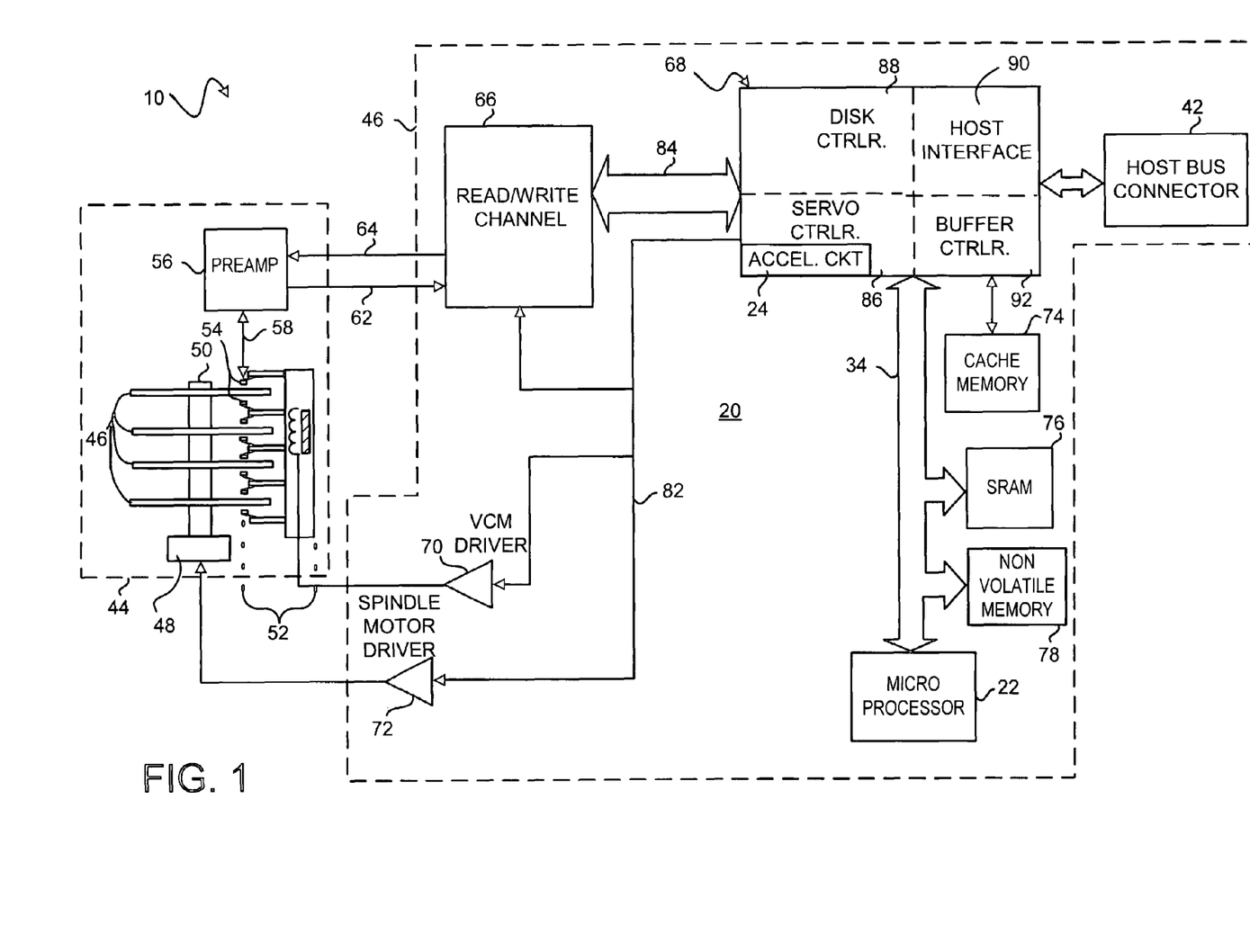
FIG. 1 is a block diagram of a disk drive having a control system including a microprocessor and a separate servo processing accelerator circuit, according to the present invention.
Figure 2:
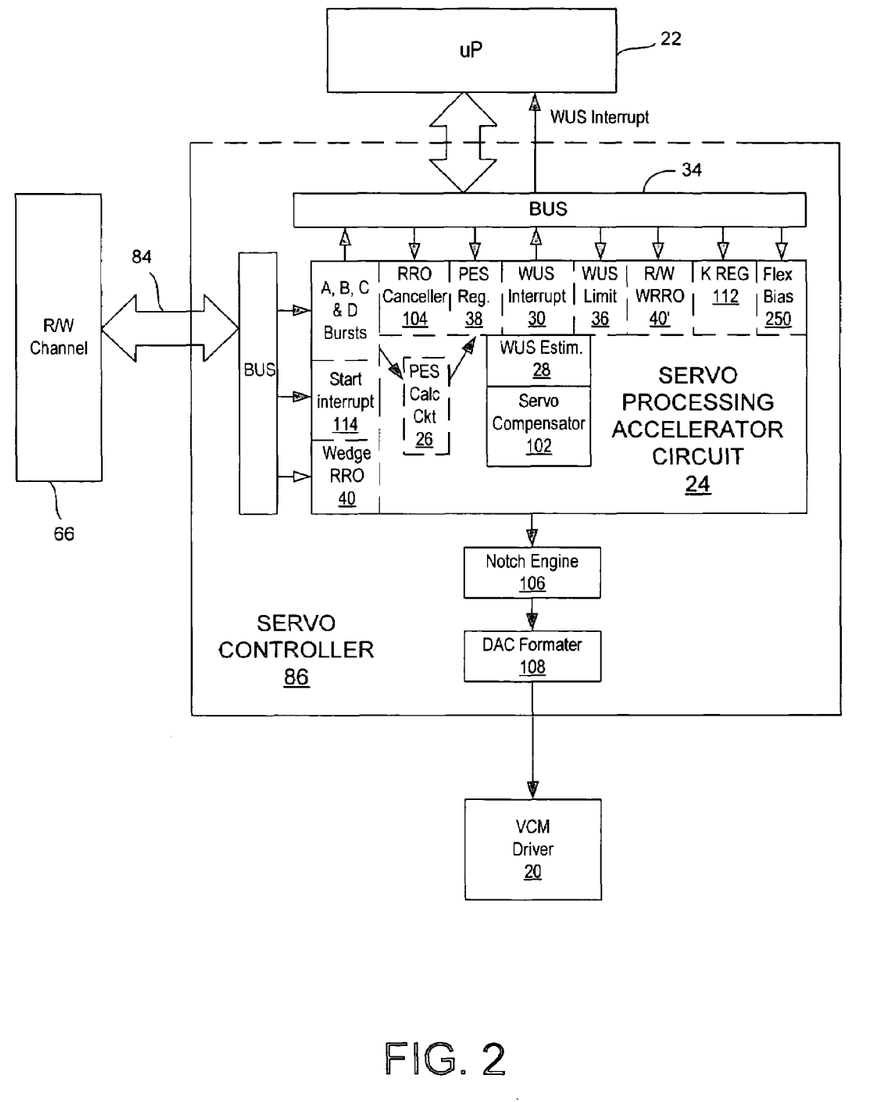
FIG. 2 is a block diagram of the servo processing accelerator circuit, according to the present invention.

With reference to FIGS. 1 and 2, a first embodiment of the present invention may reside in a control system 20 for processing sampled servo data in a disk drive 10. The control system includes a microprocessor 22 for executing firmware code, and a servo processing accelerator circuit 24 for performing operations on the sampled servo data while the microprocessor is executing the firmware code. The accelerator circuit has a position error signal (PES) calculator circuit 26 for calculating a PES value based on the sampled servo data, and has a write unsafe (WUS) estimator 28 responsive to the calculated PES value and to a WUS limit parameter. The WUS estimator further signals the microprocessor when the calculated PES value exceeds the WUS limit parameter using, e.g., a WUS interrupt 30.

The control system 20 further includes a bus 34 for transmitting the WUS limit parameter from the microprocessor 22 to the servo processing accelerator circuit 24. The accelerator circuit further comprises a WUS limit register 36 for storing the WUS limit parameter and a PES register 38 for storing the calculated PES value. The PES value may be further based on a parameter, e.g., wedge RRO, stored in a wedge RRO register 40. As discussed in more detail below with respect to FIGS. 3 and 8, the accelerator circuit may have a plurality of multipliers that may simultaneously perform parallel calculations.

The servo processing accelerator circuit 24 advantageously supports the use of a higher servo bandwidth thus allowing a higher track density resulting a greater storage capacity for the disk drive 10. Also, the accelerator circuit 24 relieves the microprocessor 22 of the ordinary servo processing function thereby allowing the microprocessor's limited processing capacity to be directed to other controller and interface functions of the disk drive. Only under unusual conditions, such as a WUS limit exception, does the microprocessor need to direct processing capacity to the servo processing function. A decreased response time after reading the servo data from the disk may be another advantage of the accelerator circuit. If a shock event has forced the head position beyond the WUS limit, a write operation is stopped in an attempt to prevent damage to previously written data on an adjacent track. The sooner the write operation is stopped, the less likely a shock event will damage data on an adjacent track.

The disk drive 10 is connectable to a host, such as a computer (not shown), via a host bus connector 42 for the transfer of commands, status and data. One suitable standard for such connection is the Advanced Technology Attachment (ATA) standard presently favored for desktop personal computers. The disk drive 10 comprises a Head/Disk Assembly (HDA) 44, and the control system 20 mounted on a printed circuit board assembly PCBA 46.

The HDA 44 includes one or more disks 46 for data storage, a spindle motor 48 for rapidly spinning each disk 46 (four shown) on a spindle hub 50, and an actuator assembly 52 for swinging heads 54 in unison over each disk 46. The heads 50 are connected to a preamplifier 56 via a trace assembly 58 for reading and writing data on the disks 46. The preamplifier 56 is connected to channel circuitry in the control system 20 via a read data line 62 and a write data line 64.

The control system 20 comprises a read/write channel 66, a host interface and disk controller (HIDC) 68, a voice coil motor (VCM) driver 70, a spindle motor driver (SMD) 72, the microprocessor 22, and several memory arrays—buffer or cache memory 74, static random access memory (SRAM) 76, and non-volatile memory 78. A serial bus 82 provides a medium for bi-directional transfer of digital data for programming and monitoring the channel 66, the VCM driver 70 and the SMD 72.

Host initiated operations for reading and writing data in the disk drive 10 are executed under control of the microprocessor 22 connected to the HDIC 68 and the memory arrays via the bus 34. Program code (i.e., firmware code) executed by the microprocessor 22 is stored in the non-volatile memory 78 and random access memory SRAM 76. Program overlay code stored on reserved tracks of the disks 46 may also be loaded into the RAM 76 as required for execution.

During disk read and write operations, data transferred by the preamplifier 56 is decoded and encoded by the read/write channel 66. During read operations, the channel 66 decodes data into digital bits transferred on an NRZ bus 84 to the HIDC 68. During write operations, the HIDC provides digital data over the NRZ bus to the channel 66 which encodes the data prior to its transmittal to the preamplifier 56.

The HIDC 68 comprises a servo controller 86, a disk controller 88 for formatting and providing error detection and correction of disk data, a host interface controller 90 for responding to commands from a host, and a buffer controller 92 for storing data which is transferred between the disks 46 and the host. Collectively, the controllers in the HIDC 68 provide automated functions which assist the microprocessor 22 in controlling disk operations.

The servo controller circuit 86 in the HIDC 68 provides an interface between the microprocessor 22 and the actuator assembly 52 and the spindle motor 48. The microprocessor 22 configures and commands logic in the servo controller 86 for positioning the actuator 52 using the VCM driver 70 and for precisely controlling the rotation of the spindle motor 40 with a spindle motor driver 72.

Preferably, the disk drive 10 employs a sampled servo system in which equally spaced servo wedge sectors (sometimes termed "servo wedges") are recorded on each track of each disk 46. Data sectors are recorded in the intervals between servo sectors on each track. The servo sectors are sampled at regular intervals to provide servo position information for positioning the actuator 52.

Figure 3:
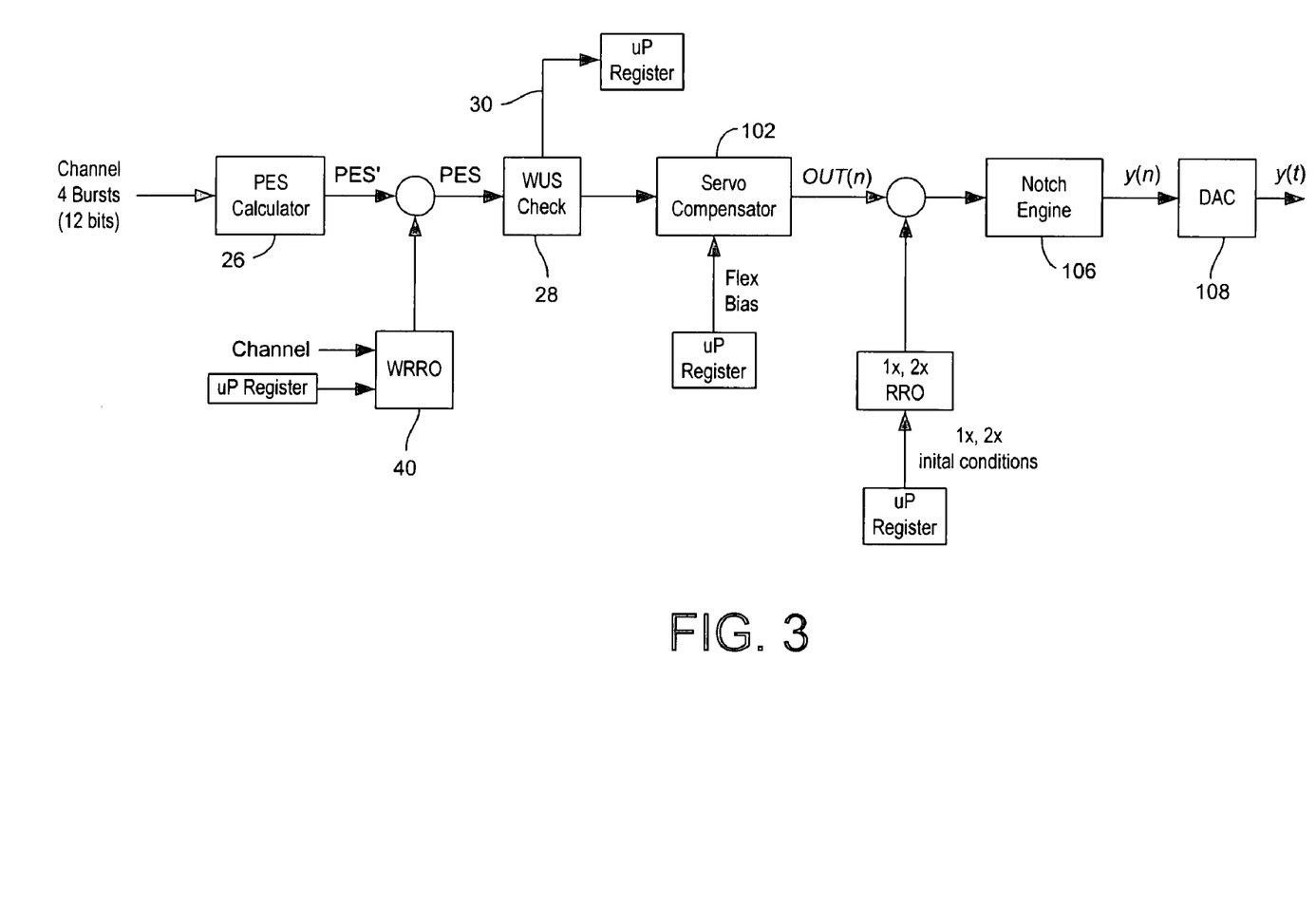
FIG. 3 is a block diagram of signal flow for the separate accelerator circuit of FIG. 2.

The servo sectors have track ID numbers and a pattern of four servo bursts, A, B, C and D, for determining the position of the head 54 over the respective disk surface. The bursts are digitized and scaled by the read/write channel 66 and output to the servo controller 86. Depending on the state of the current track following operation, the accelerator circuit 24 generates an actuator control signal, or the servo burst data is forwarded to the microprocessor 22, via the bus 34, and the microprocessor generates the actuator control signal. With reference to FIG. 3, during track following, the four servo bursts are processed by the PES calculator circuit 26. Further, calibrated wedge repeatable runout (WRRO) values 40, read from the disk 46 and/or provided by the microprocessor 22 may be added to the PES to compensate for the WRRO. The PES may be checked for a write-unsafe (WUS) condition by a WUS estimator or check circuit 28. A WUS interrupt 30 may be sent to the microprocessor by the WUS check circuit if the PES exceeds a WUS threshold or limit. A servo compensator 102 transforms the PES into an initial control signal OUT(n). The initial control signal is compensated for once-around (1×) and twice-around (2×) RRO by an RRO canceller 104 (FIG. 2), and then filtered by a notch engine 106 yielding a digital control signal y (n). The digital control signal is converted to an analog control signal y (t) by a digital-to-analog converter (DAC) 108. The specific order of the signal processing blocks shown in FIG. 3 may be changed to accommodate alternative or additional signal processing schemes for generating the control signal y(t).

Figure 4:
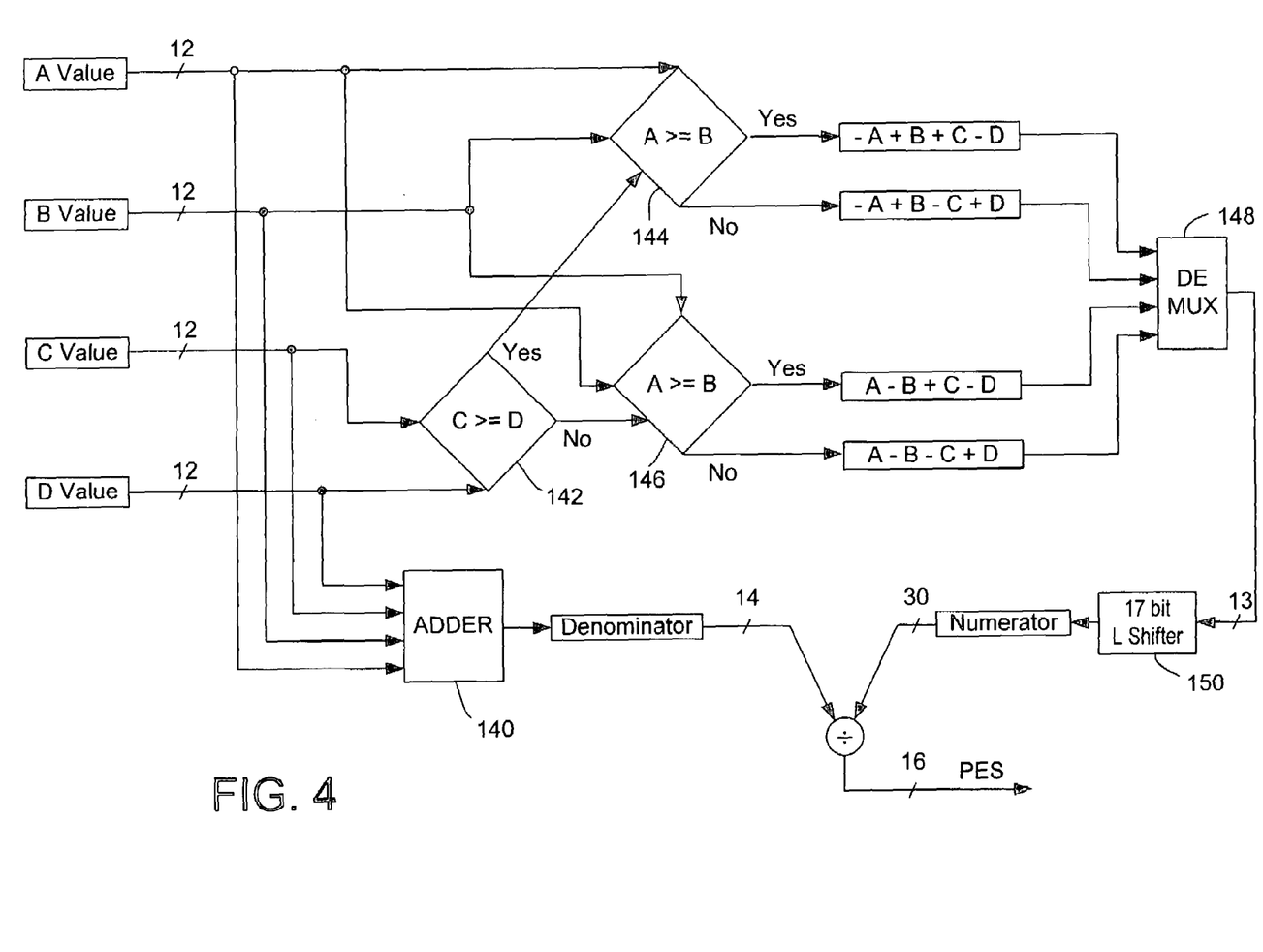
FIG. 4 is a block diagram showing logic decisions associated with a position error signal (PES) calculation.
Figure 5:
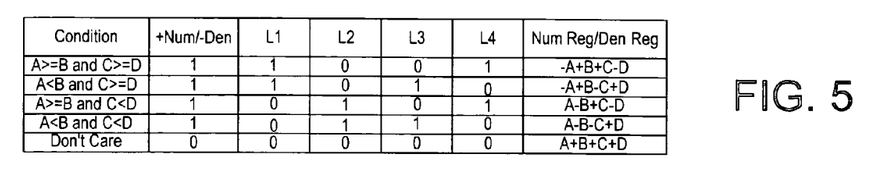
FIG. 5 is a logic table associated with the PES calculation.

With reference to FIG. 4, the PES may be calculated from the servo burst values, A, B, C and D. The servo burst values a summed together by an adder 140. The sum of the 12-bit servo burst values yields a 14-bit value that is the denominator (DEM) in the PES calculation. The numerator (NUM) of the PES calculation depends on relationships between the servo burst values. The numerator is calculated from the servo burst values using one of four equations selected in accordance with logic shown by logic blocks 142, 144 and 146, and summarized in a table in FIG. 5. Based on the logic condition, a demultiplexer 148 selects one of the four equations for calculating the numerator value. The selected numerator value is expanded from 13 bits to 30 bits by a 17-bit left-shift register 150. The 16-bit PES value is calculated by dividing the selected numerator value by the denominator value.

Figure 6:
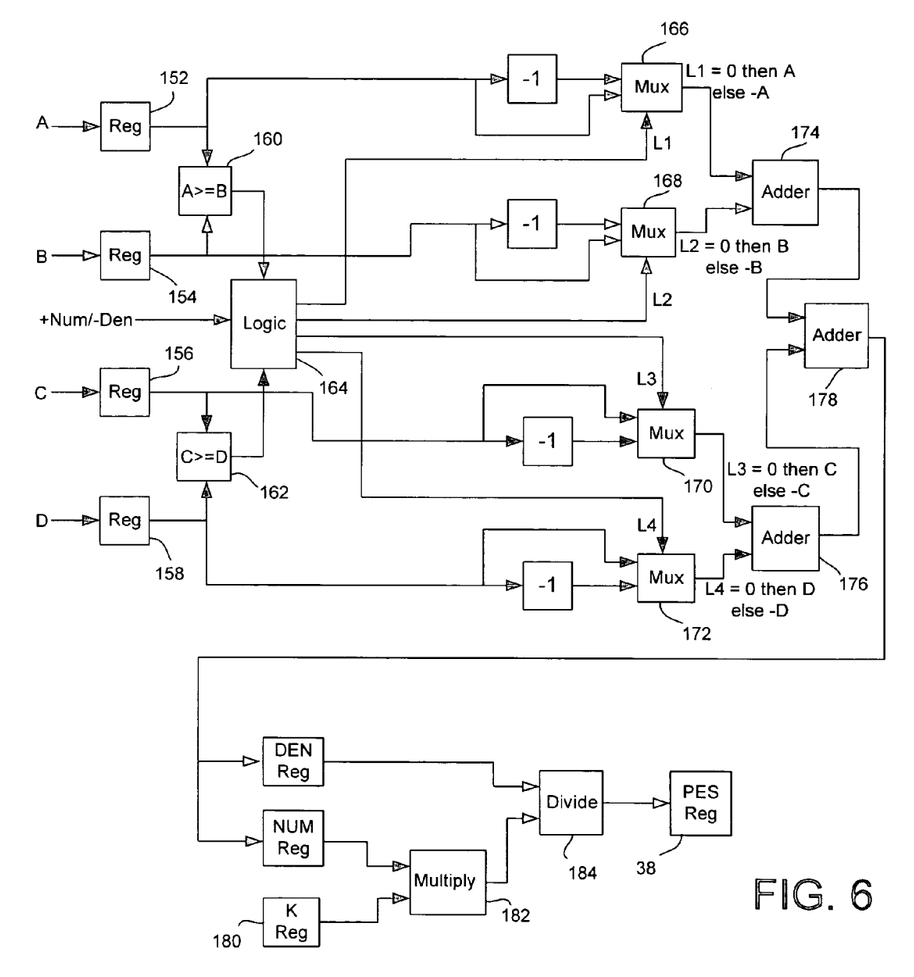
FIG. 6 is a block diagram of a PES calculation circuit of the accelerator circuit.

FIG. 6 shows a block diagram of the PES calculation circuit 26. The servo burst values are stored in respective registers 152, 154, 156 and 158. A first compare logic 160 determines whether the servo burst value A is greater than or equal to the servo burst value B. A second compare logic 162 determines whether the servo burst value C is greater than or equal to servo burst value D. A logic circuit 164 determines logic values L1, L2, L3 and L4, for determining whether the respective servo burst values must be negated in accordance with the table in FIG. 5. If the denominator is being determined, then none of the servo burst values are negated. The appropriate servo burst values are selected by multiplexers 166, 168, 170, 172, under control of the logic circuit 164. The selected servo burst values are summed by adders 174, 176 and 178. The calculated denominator value is placed in a DEN register and the calculated numerator value is placed in a NUM register. The numerator value is multiplied by a K factor, stored in a K register 180, using a multiplier circuit 182, and the result is divided by the denominator value using a divider circuit 184 to generate the PES value, which is stored in the PES register 36. The K factor scales the PES in accordance with the sensitivity of the head 54, preamplifier 56, and the read/write channel 66.

Figure 7:
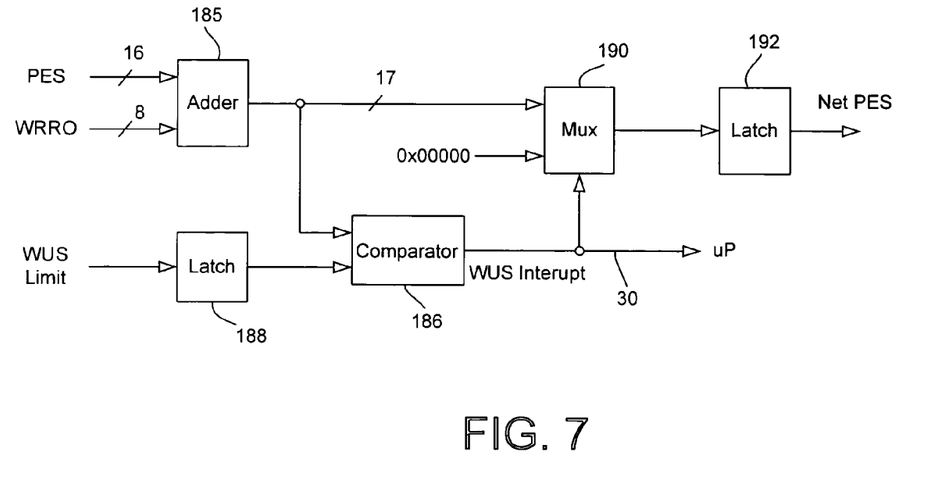
FIG. 7 is a block diagram of a write unsafe (WUS) check circuit of the accelerator circuit.

With reference to FIG. 7, the wedge RRO (WRRO) 40 may be added to the PES by an adder 185 to generate a WRRO compensated PES. The compensated PES is compared by a comparator 186 with the WUS limit stored in a latch 188. If the compensated PES exceeds the WUS limit, a WUS interrupt 30 is transmitted to the microprocessor 22 to stop a pending write operation. The WUS interrupt is also sent to a multiplexer 190 for setting the PES to a null value. The compensated or net PES is stored in a latch circuit 192.

Figure 8:
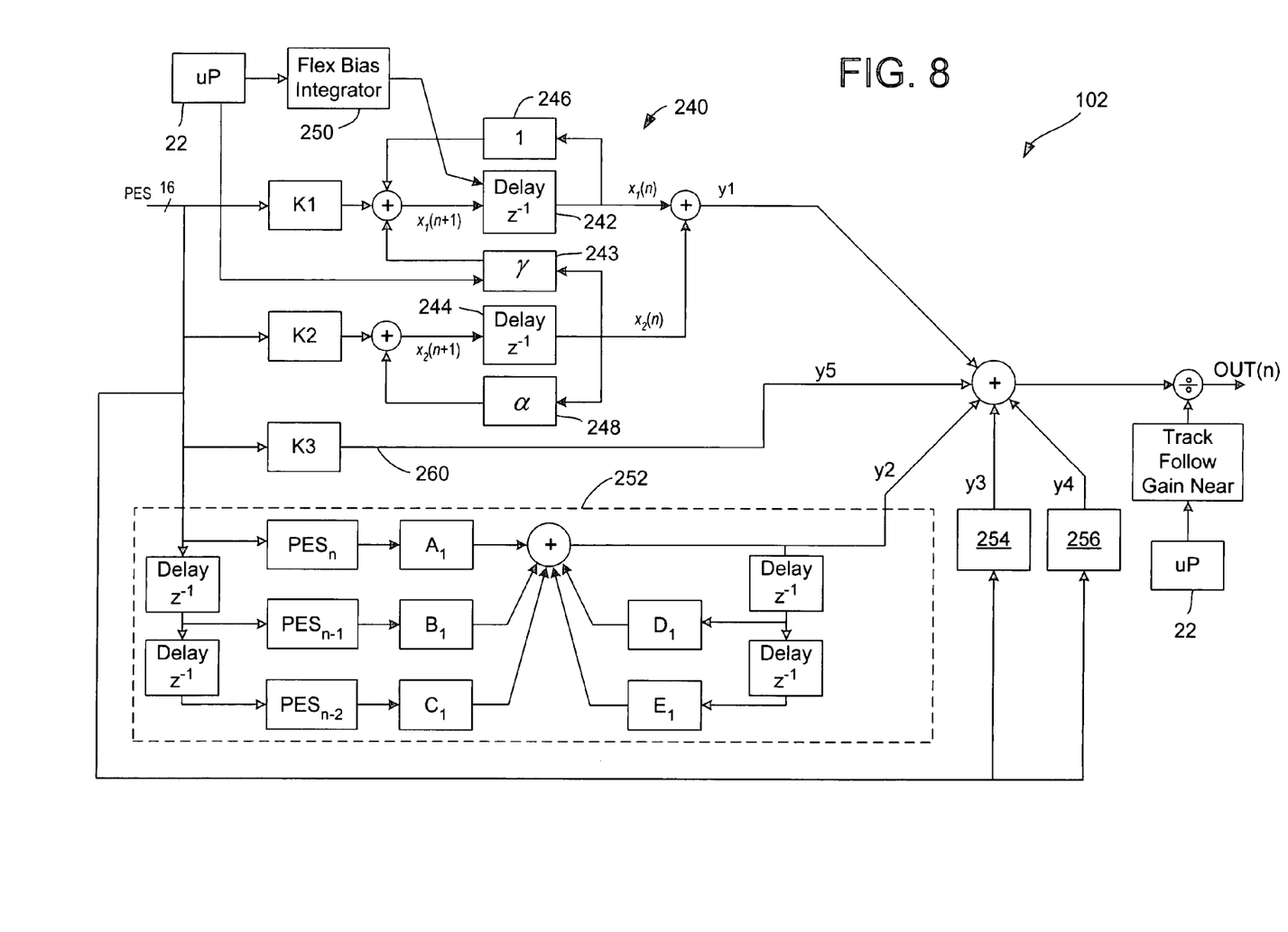
FIG. 8 is a block diagram of a servo compensator of the accelerator circuit.

With reference to FIG. 8, the servo compensator 102 receives and processes the PES and generates an output signal (OUT) for controlling the head position. The servo compensator is shown with several parallel servo paths for simultaneously performing calculations. As indicated by Equation 1:

$$\text{Out}(n) = \frac{1}{\text{Gain}}(y1 + y2 + y3 + y4 + y5) \qquad (1)$$

The gain value is a track follow gain near value provided by the microprocessor for scaling the output signal.

A first servo path 240 of the servo compensator 102 is implemented in accordance with state equations 2 and 3:

$$\left(\begin{pmatrix} x_1(n+1) \\ x_2(n+1) \end{pmatrix} = \begin{pmatrix} 1 & \gamma \\ 0 & \alpha \end{pmatrix}\begin{pmatrix} x_1(n) \\ x_2(n) \end{pmatrix} + \begin{pmatrix} K_1 \\ K_2 \end{pmatrix} PES\right) \qquad (2)$$

where γ=0; and $$y1(n) = (1\ 1)\begin{pmatrix} x_1(n) \\ x_2(n) \end{pmatrix} \qquad (3)$$

The first servo path has first and second delay elements, 242 and 244. The first delay element is associated with a unity feedback path 246. A cross feedback element 243 may be set by the microprocessor 22, during initialization, to a desired value of γ. Advantageously, γ may be set to zero. The second delay element is associated with a gain feedback element 248 having a gain of α. The first servo path also has an integrator 250 for integrating an initial flex bias value provided by the microprocessor 22. The flex bias value can be determined based on the current disk rotation position and injected into the first servo path.

A second servo path 252 of the servo compensator 102 is implemented using a second order filter in accordance with Equation 4:

$$y2 = A_1 \cdot PES + B_1 \cdot PES \cdot z^{-1} + C_1 \cdot PES \cdot z^{-2}$$
$$-D_1 \cdot y2 \cdot z^{-1} + E_1 \cdot y2 \cdot z^{-2} \qquad (4)$$

Advantageously, the second servo path has a dedicated multiplier may operate in parallel with multipliers in other servo paths to provide a high calculation throughput thereby allowing the servo processing accelerator circuit 24 to support a relatively high servo bandwidth.

Third and fourth servo paths 254 and 256 of the servo compensator 102 are likewise implemented using second order filters in accordance with Equations 5 and 6, respectively:

$$y3 = A_2 \cdot PES + B_2 \cdot PES \cdot z^{-1} + C_2 \cdot PES \cdot z^{-2} - D_2 \cdot y3 \cdot z^{-1} + E_2 \cdot y3 \cdot z^{-2} \quad (5)$$

$$y4 = A_3 \cdot PES + B_3 \cdot PES \cdot z^{-1} + C_3 \cdot PES \cdot z^{-2} - D_3 \cdot y4 \cdot z^{-1} + E_3 \cdot y4 \cdot z^{-2} \quad (6)$$

Internally, the second order filters of the third and fourth servo paths have the same typology as the second servo path 252.

Figure 9:
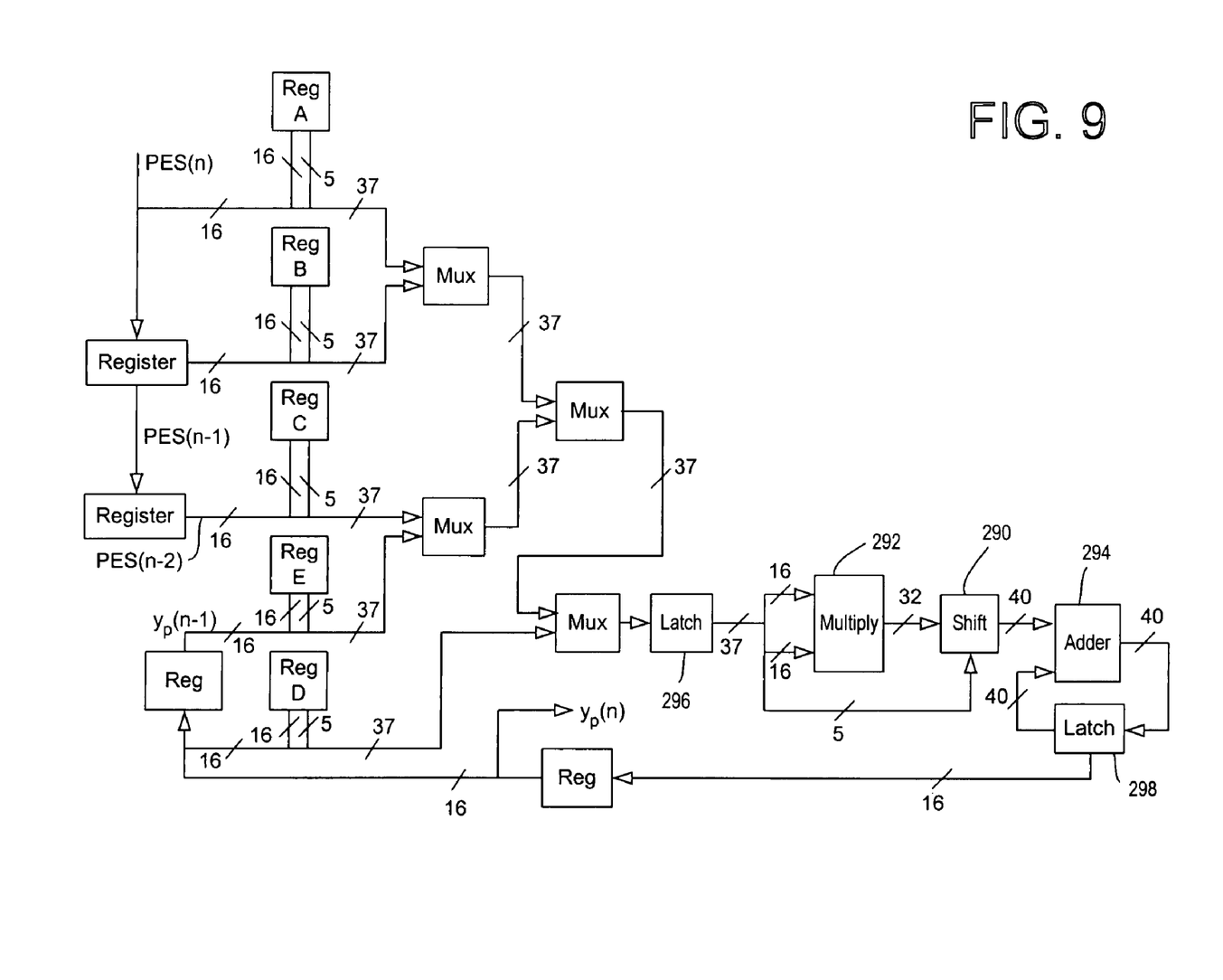
FIG. 9 is a block diagram of a second-order servo path, of the servo compensator, having a dedicated multiplier.

A hardware related schematic diagram of the second order filters of the second, third and fourth servo paths, 252, 254 and 256, is shown in FIG. 9. Each coefficient, A, B, C, D and E, is represented by a 16-bit mantissa and a 5-bit exponent in base 2. The 5 bits of exponent are used by a shift block 290 after a multiply block 292 (or multiplier) to align the binary point before an add operation of an accumulator or adder 294. To determine a path's output value y, five multiplication operations are performed. In an example of one of the multiplication operations, a 16-bit undelayed PES(n) is combined with the 16-bit mantissa and 5 bit exponent of coefficient A, stored in a register A, to form 37-bit word. The multiplexers (MUX) are configured to present the 37-bit word to an input latch 296. The 16-bit PES(n) and the 16-bit mantissa are multiplied by the multiply block to generate a 32-bit intermediate result. The 32-bit result is shifted by the 5-bit exponent to generate a 40-bit result. The 40-bit result is accumulated in the adder block 294. The multiplication process is similarly repeated for each of the remaining coefficients, B, C, D and E, with the cumulative result being stored in an output latch 298. Once the multiplication process is completed for the current sample period, the result in the output latch is the path's output value $y_p$, which is stored as a 16-bit value for combining with the output values of the other paths.

A fifth servo path 260 is merely the PES scaled by a constant value as indicated by equation 7:

$$y5(n) = K_3 \cdot PES(n) \quad (7)$$

Figure 10:
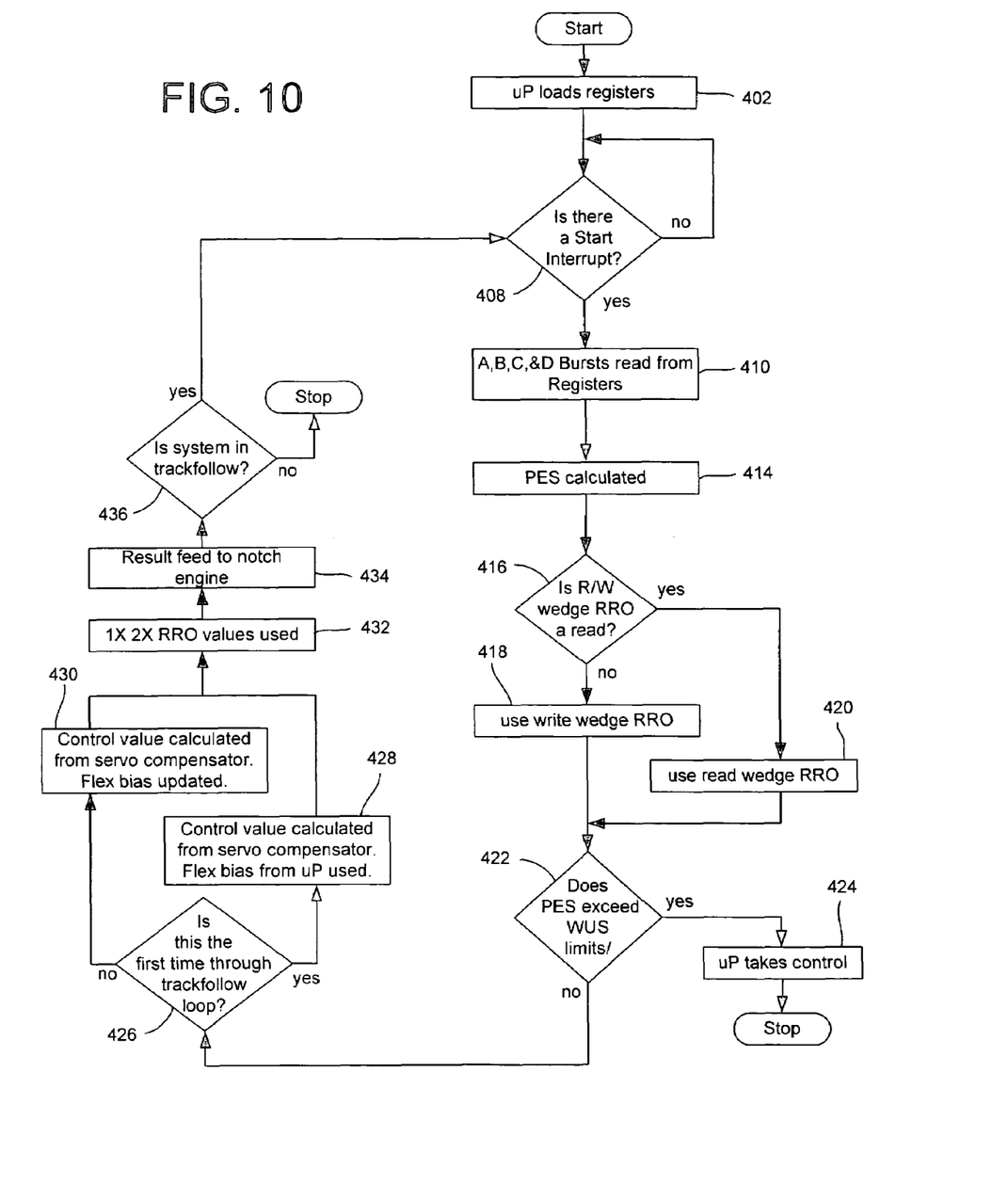
FIG. 10 is a block diagram of a control process for trackfollowing using the separate accelerator circuit, according to the present invention.

A process for using the servo processing accelerator circuit 24 is shown in FIG. 10. The microprocessor 22 loads the appropriate registers in the accelerator circuit 24, depending on the state of the disk drive, across the bus 34 (step 402). At initial power on, the microprocessor loads values for K1, K2, K3, A, B, C, D, a, γ,etc. in the corresponding registers. At or before track acquisition, the microprocessor loads the WUS limits, R/W WRRO, flex bias value, K value, etc., into the appropriate registers, 36, 40', 250, and 112. The read/write channel 66 sets a start interrupt 114 when all four servo burst values have been captured and stored in registers. After the start interrupt is set (step 408), the accelerator circuit reads the servo burst values (step 410) and may forward a copy to the microprocessor 22. The PES calculator 26 calculates the PES (step 414), which is adjusted by the read or write wedge RRO, depending on the current data access operation (steps 416, 418 and 420). If the PES exceeds the WUS limits (step 422), the microprocessor takes control of the track following operation (step 424), including the servo processing, and processing by the accelerator circuit stops. If the PES is within the WUS limits, the flex bias value from the microprocessor is used for the first pass through the track-follow operation or loop (steps 426, 428 and 430). The 1× and 2×RRO values are used to modify the control signal (step 432), which is then feed to the notch engine 106 (step 434). If the track-follow operation is continuing, the process is repeated by the accelerator circuit (step 436). Otherwise, the trackfollow operation is stopped. The sequence of events shown in FIG. 10 may be changed to accommodate alternative or additional events in the use of the accelerator circuit 24.

With reference again to FIGS. 1 and 2, a second embodiment of the present invention may reside in a control system 20 for processing data from sampled servo wedges for positioning a transducer head 54 in a disk drive 10. In this embodiment, the servo processing accelerator circuit 24 includes a position error signal (PES) calculator circuit 26 for calculating a stream of PES values based on data read from the sampled servo wedges, and a servo-loop compensator 102 for processing the stream of PES values and generating a stream of control effort values for positioning the transducer head during a track following operation.

A third embodiment of the invention may reside in a magnetic disk drive 10 having a head disk assembly (HDA) 44 and a control system 20. The HDA includes a rotating magnetic disk 50 having distributed position information in a plurality of uniformly spaced-apart servo wedges for defining data storage tracks, an actuator 52 for positioning a transducer head 54 in response to a control effort signal, the transducer head for periodically reading the distributed position information from the servo wedges and reading data from the data storage tracks. The control system has an accelerator circuit 24 for implementing a first sampled servo controller, and has a second sampled servo controller (implemented by, e.g., the microprocessor 22) separate from the accelerator circuit. The first sampled servo controller periodically adjusts the control effort signal based on the distributed position information only during a track-following operation under one or more of a first set of predetermined conditions. The first sampled servo controller also indicates the occurrence of a predetermined condition within a second set of predetermined conditions to the control system. The second sampled servo controller periodically adjusts the control effort signal based on the distributed position information during a track-following operation under one or more of a second set of predetermined conditions. The control system selects the first sampled servo controller for adjusting the control effort signal during a track-following operation under one or more of a first set of predetermined conditions, and selects the second sampled servo controller for adjusting the control effort signal during an operation under one or more of a second set of predetermined conditions.

The control system may include a disk controller 88 for controlling disk operations, and a host interface 90 for coupling the disk controller with a host system. The second sampled servo controller, the disk controller and the host interface may be implemented by a microprocessor 22 that is separate from the accelerator circuit 24. The second sampled servo controller may be implemented by the microprocessor using firmware code. The accelerator circuit may have a plurality of multipliers that may simultaneously perform parallel calculations. The first set of predetermined conditions may include track following within a write unsafe (WUS) limit, and the second set of predetermined conditions may include track following outside of a write unsafe (WUS) limit.

The first sampled servo controller, after receiving distributed position information in a servo wedge, may adjust the control effort signal after a first processing delay. In contrast, the second sampled servo controller, after receiving distributed position information in a servo wedge, can adjust the control effort signal after a second processing delay that is greater than the first processing delay. The processing delay of the accelerator circuit 24 may be much shorter than the processing delay of the microprocessor 22. For example, the first processing delay may be less than one-tenth of the second processing delay. Alternatively, the first processing delay may be less than one-fourth of the second processing delay.

A fourth embodiment of the invention may reside in a magnetic disk drive 10 in which the control system 20 includes an accelerator circuit 24 and a microprocessor 22 separate from the accelerator circuit. The accelerator circuit implements a first sampled servo controller for periodically adjusting, only during a track-following operation under one or more of a first set of predetermined conditions, the control effort signal based on the distributed position information with a first processing delay. The microprocessor implements a second sampled servo controller using firmware code for periodically adjusting the control effort signal based on the distributed position information, with a second processing delay that is substantially greater than the first processing delay, during an operation under one or more of a second set of predetermined conditions. The control system selects the first sampled servo controller for adjusting the control effort signal during a track-following operation under one or more of a first set of predetermined conditions, and selects the second sampled servo controller for adjusting the control effort signal during an operation under one or more of a second set of predetermined conditions.

What is claimed is:

1. A magnetic disk drive, comprising:
    a head disk assembly (HDA) including
        a rotating magnetic disk having distributed position information in a plurality of uniformly spaced-apart servo wedges for defining data storage tracks,
        an actuator for positioning a transducer head in response to a control effort signal, the transducer head for periodically reading the distributed position information from the servo wedges and reading data from the data storage tracks; and
    a control system having
        an accelerator circuit for implementing a first sampled servo controller for periodically adjusting, only during a track-following operation under one or more of a first set of predetermined conditions, the control effort signal based on the distributed position information, and for indicating the occurrence of a predetermined condition within a second set of predetermined conditions to the control system;
        a second sampled servo controller, separate from the accelerator circuit, for periodically adjusting the control effort signal based on the distributed position information during a track-following operation under one or more of the second set of predetermined conditions.

2. A magnetic disk drive as defined in claim 1, wherein the control system further includes a disk controller for controlling disk operations and a host interface for coupling the disk controller with a host system; and
    the second sampled servo controller, the disk controller and the host interface are implemented by a microprocessor that is separate from the accelerator circuit.

3. A magnetic disk drive as defined in claim 1, wherein the second sampled servo controller is implemented by the microprocessor using firmware code.

4. A magnetic disk drive as defined in claim 1, wherein the accelerator circuit has a plurality of multipliers that may simultaneously perform parallel calculations.

5. A magnetic disk drive as defined in claim 1 wherein the first set of predetermined conditions includes track following within a write unsafe limit.

6. A magnetic disk drive as defined in claim 1 wherein the second set of predetermined conditions includes track following outside of a write unsafe limit.

7. A magnetic disk drive as defined in claim 1, wherein, after receiving distributed position information in a servo wedge, the first sampled servo controller can adjust the control effort signal after a first processing delay and the second sampled servo controller can adjust the control effort signal after a second processing delay, wherein the first processing delay is less than the second processing delay.

8. A magnetic disk drive as defined in claim 7, wherein the first processing delay is less than one-tenth of the second processing delay.

9. A magnetic disk drive as defined in claim 7, wherein the first processing delay is less than one-fourth of the second processing delay.

10. A magnetic disk drive, comprising:
    a head disk assembly (HDA) including
        a rotating magnetic disk having distributed position information in a plurality of uniformly spaced-apart servo wedges for defining data storage tracks;
        an actuator for positioning a transducer head in response to a control effort signal, the transducer head for periodically reading the distributed position information from the servo wedges and reading data from the data storage tracks; and
    a control system having
        an accelerator circuit for implementing a first sampled servo controller for periodically adjusting, only during a track-following operation under one or more of a first set of predetermined conditions, the control effort signal based on the distributed position information with a first processing delay;
        a microprocessor, separate from the accelerator circuit, for implementing a second sampled servo controller using firmware code for periodically adjusting the control effort signal based on the distributed position information, with a second processing delay that is substantially greater than the first processing delay, during an operation under one or more of a second set of predetermined conditions;
    wherein the control system selects the first sampled servo controller for adjusting the control effort signal during a track-following operation under one or more of a first set of predetermined conditions, and selects the second sampled servo controller for adjusting the control effort signal during an operation under one or more of a second set of predetermined conditions.

11. A magnetic disk drive as defined in claim 10, wherein the first processing delay is less than one-tenth of the second processing delay.

12. A magnetic disk drive as defined in claim 10, wherein the first processing delay is less than one-fourth of the second processing delay.

13. A magnetic disk drive as defined in claim 10, wherein the control system further includes a disk controller for controlling disk operations and a host interface for coupling the disk controller with a host system; and the second sampled servo controller, the disk controller and the host interface are implemented by a microprocessor that is separate from the accelerator circuit.

14. A magnetic disk drive as defined in claim 10, wherein the second sampled servo controller is implemented by the microprocessor using firmware code.

15. A magnetic disk drive as defined in claim 10, wherein the accelerator circuit has a plurality of multipliers that may simultaneously perform parallel calculations.

16. A magnetic disk drive as defined in claim 10 wherein the first set of predetermined conditions includes track following within a write unsafe limit.

17. A magnetic disk drive as defined in claim 10 wherein the second set of predetermined conditions includes track following outside of a write unsafe limit.

* * * * *